Nov. 4, 1969
J. R. CAMPBELL
3,476,422
HONEYCOMB CORE PANEL MOUNTING
AND CONNECTING SYSTEM
Filed Nov. 7, 1966
2 Sheets-Sheet 1
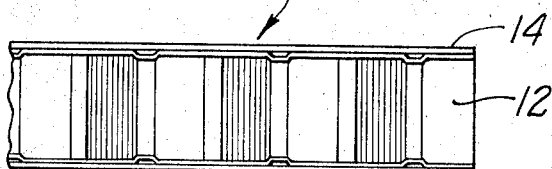
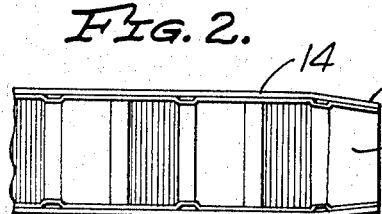
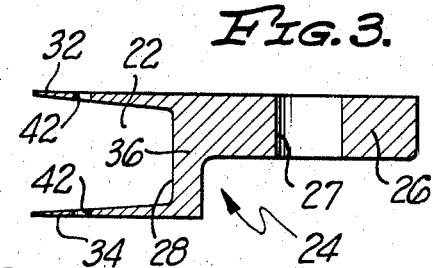
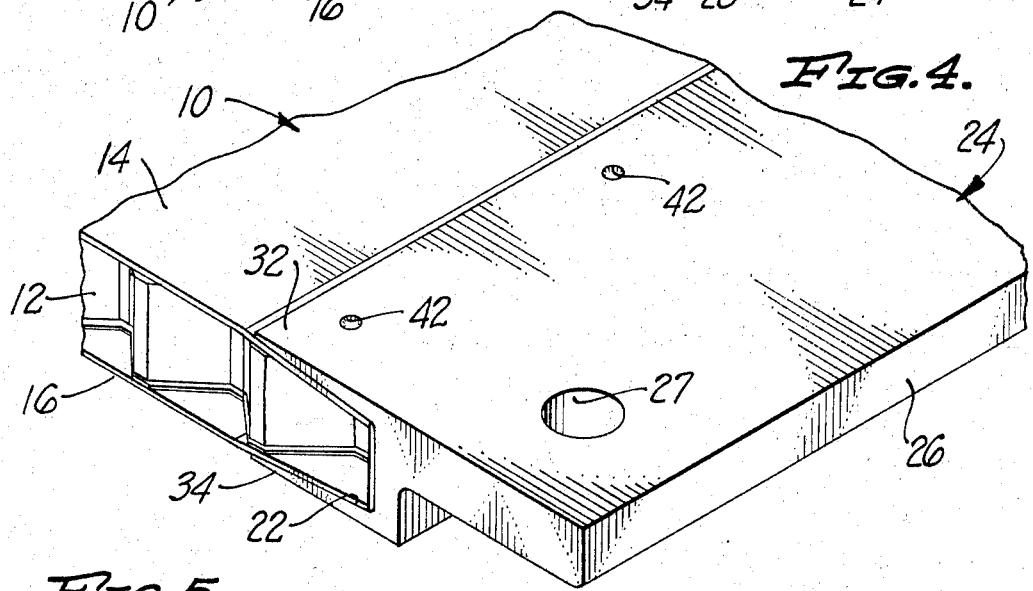
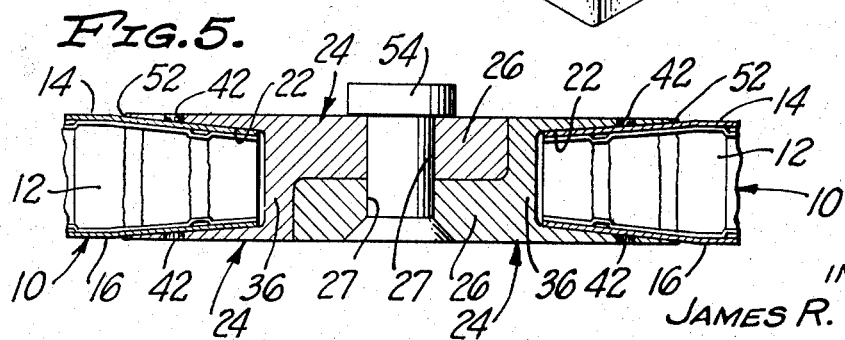
INVENTOR
JAMES R. CAMPBELL
BY
MAHONEY & HORNBAKER
ATTORNEYS

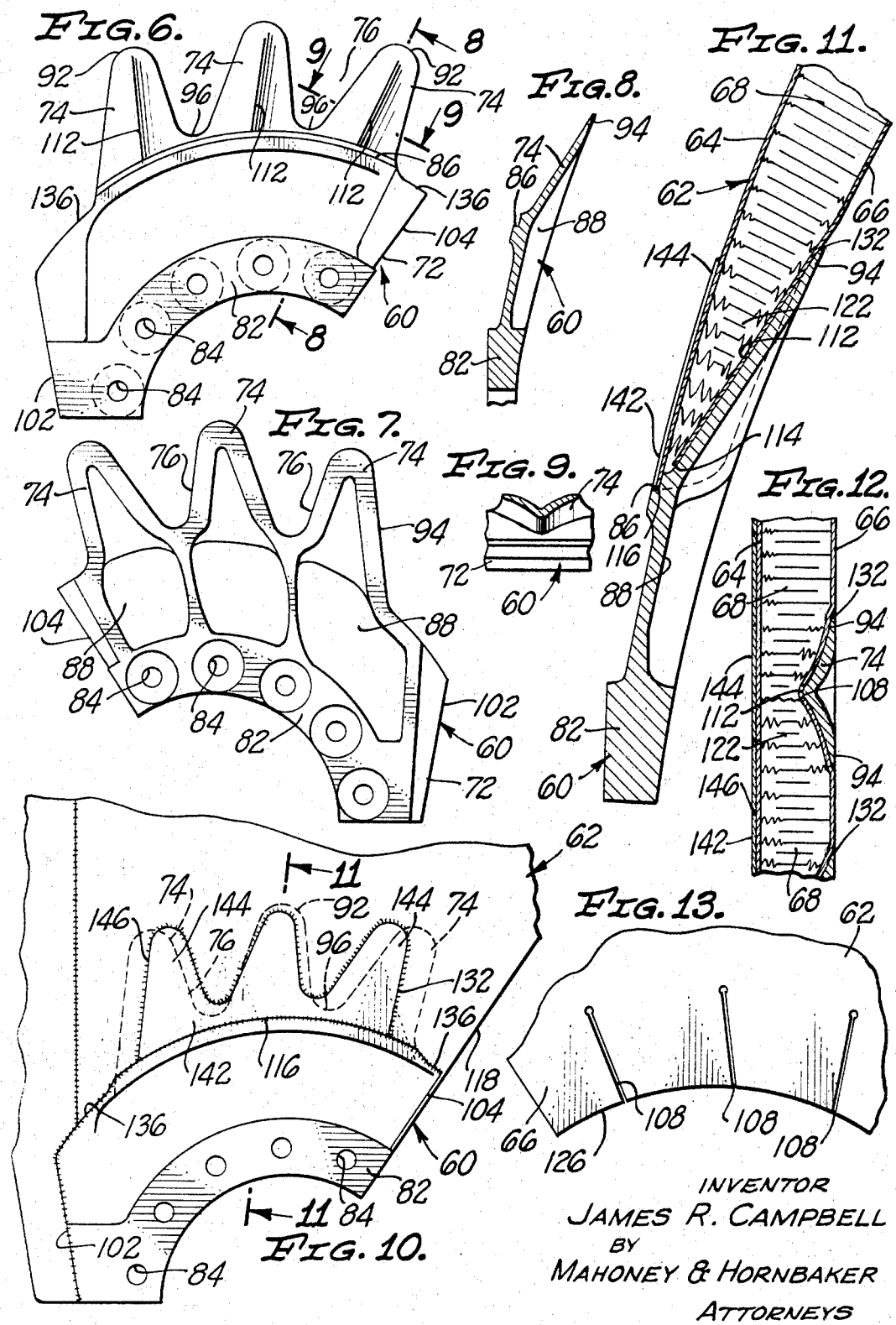

United States Patent Office 3,476,422
Patented Nov. 4, 1969

3,476,422
HONEYCOMB CORE PANEL MOUNTING AND
CONNECTING SYSTEM
James R. Campbell, 1504 Carmelita St.,
Laguna Beach, Calif. 92651
Filed Nov. 7, 1966, Ser. No. 592,620
Int. Cl. F16b 1/00, 5/00
U.S. Cl. 287—189.36                                5 Claims

ABSTRACT OF THE DISCLOSURE

This invention relates to a method of attaching a bracket to a honeycomb core reinforced article and to the attachment system incorporating said article. The practice of the method and the attachment system involve the utilization of a bracket which is positively affixed to the subjacent surfaces of the panel and which is forced against the panel to deform the portion of the panel engaged by the bracket into conformity with the shape of the bracket.

---

This invention relates to a honeycomb core reinforced panel mounting and connecting system and, more particularly, to the method of creating such a system and to the article resulting from said method.

As is well known to those skilled in the art, the advancement of aircraft and missile technology involves the utilization of honeycomb core reinforced panels which are provided in various structural configurations where the structural strength and relatively low weight in proportion to said strength are significant factors in the adoption of the honeycomb core structures. Furthermore, the elevated temperatures and high speeds encountered in slightly subsonic and supersonic aircraft and missiles entail the use of honeycomb core panel structures characterized by the incorporation of stainless steel honeycomb core and surface sheets on the opposite surfaces of said honeycomb core fabricated from stainless steel.

The prior art has approached the problem of mounting and connecting articles fabricated from honeycomb core reinforced panels by the utilization of localized fasteners which are customarily inserted in or through the core structures and which, because of their relatively small size and localized application of shear and other forces to the honeycomb core panel structures have not been entirely satisfactory as a means of mounting and/or connecting said panels in operative relationship with associated aircraft or missile structures or with the adjacent portions of other panels.

Because of the fact that prior art fasteners adapted for use in conjunction with articles fabricated from honeycomb core reinforced panels have not taken into consideration the need for distribution of the forces to which the articles are subjected and apply such forces in relatively localized areas, there has been a need for a system and method for mounting and connecting such articles in which the various forces to which the articles are subjected will be adquately distributed throughout the adjacent areas of the articles.

While the teachings of the invention will be described as embodied in a honeycomb core panel structure in which the core is fabricated of stainless steel foil and the surface sheets of panel are constituted by stainless steel, it will, of course be obvious to those skilled in the art that the teachings of the invention may be applied with equal cogency to various types of panels fabricated from other materials and to various articles utilized in differing environments and it is, therefore, not intended that the teachings of the invention be liimted to honeycomb core panels manufactured from any particular material or to honeycomb core panels fabricated into an article of any particular configuration.

However, to facilitate the consideration of the teachings of the invention, the method and resulting article will be described as utilized in securing the adjacent edges of articles fabricated from honeycomb core panels in operative relationship with each other and, also, in attaching a mounting bracket to an article which is intended to be moved through a predetermined path of movement.

It is, therefore, an object of my invention to provide a method of connecting an attachment or mounting bracket in operative relationship with a honeycomb core reinforced article wherein the mounting or attaching brackets are so secured in operative relationship with the article that the shear and other loads to which the article is subjected will be adequately transmitted through the attaching or mounting brackets.

An additional and associated object of my invention is the provision of a method of attaching a member in operative relationship with a honeycomb core reinforced article which entails the concept of providing a recess in a surface of said article and inserting into said recess said member, said member being of the same configuration as said recess and being secured in operative relationship with said article.

Another object of my invention is the provision of a method of installing a member in operative relationship with a honeycomb core reinforced article wherein the member is utilized as a die to form a correspondingly shaped recess in a portion of the article and wherein the member is subsequently secured in operative relationship with the article.

A further object of my invention is the provision of a method of attaching a load bearing or securement member in operative relationship with a honeycomb core reinforced article wherein the exterior surface of the member is disposed in substantial coplanarity with the corresponding surface of the article to obtain optimum aerodynamic characteristics.

A further object of my invention is the provision of a honeycomb core reinforce article having a mounting or attachment member secured in operative relationship therewith wherein said attachment member or mounting member is so secured as to adequately distribute throughout the portion of the article to which the member is attached the shear and other loads to which the article is subjected.

A further object of my invention is the provision of load distributing means of the aforementioned character which is particularly adapted for utilization in conjunction with a honeycomb core reinforced panel or an article fabricated from such a panel and which is operatively secured to the panel in such a manner as to prevent stress concentrations in the opposite surfaces of the panel and to encompass a substantial area of the core structure to pick up core shear. By controlled crushing of the honeycomb core underlying a portion of the member utilized in operative relationship with the panel, the crushing of the core is permitted to taper gradually to zero at the perimeter of the associated portion of the member to provide equalized stress distribtuion.

Another object of my invention is the provision of an attachment or mounting member for utilization in conjunction with a honeycomb core reinforced article wherein said members incorporates at least one receptacle for the reception of a corresponding portion of the honeycomb core reinforced article with which the member is associated. Therefore, relatively large portions of the honeycomb core reinforced article are encompassed by the member and there is a structural integration between the article and member which results in the ultimate distribution of shear and other loads from the article through the associated member.

A further object of my invention is the provision of an attachment or supporting member specifically designed for operative relationship with a honeycomb core reinforced article wherein the attachment or supporting member incorporates an exterior surface adapted to be disposed in substantial coplanarity with the adjacent surface of the honeycomb core reinforced article to which it is secured and thus provides maximum aerodynamic characteristics to the resulting composite article.

A further object of my invention is the provision of an attachment or supporting member of the aforementioned character wherein the member incorporates at least one receptacle adapted to receive a corresponding portion of the adjacent area of the honeycomb core article thus serving to positively locate the member in operative relationship with the relevant portion of the article and to achieve optimum securement of the member in said operative relationship.

Other objects and advantages of the invention will be apparent from the following specification and the accompanying drawings which are for the purpose of illustration only and in which:

FIG. 1 is a fragmentary, enlarged edge view of a honeycomb core panel;

FIG. 2 is a view similar to FIG. 1 showing the leading edge of the panel partially deformed;

FIG. 3 is a vertical, sectional view of an attachment member adapted to be mounted in operative relationship with the deformed edge of the panel shown in FIG. 2;

FIG. 4 is an enlarged, fragmentary, sectional view showing the member of FIG. 3 mounted in operative relationship with the leading edge of the aforesaid panel;

FIG. 5 is a vertical, sectional view showing the manner in which the adjacent edges of two honeycomb core reinforced articles or panels may be operatively connected to each other by the utilization of attachment members in the character of that shown in FIG. 4;

FIG. 6 is a top plan view of a mounting or supporting bracket or member adapted to be secured in operative relationship with a honeycomb core reinforced article;

FIG. 7 is a bottom plan view of said mounting or supporting bracket or member;

FIG. 8 is an enlarged, fragmentary, sectional view taken along the broken line 8—8 of FIG. 6;

FIG. 9 is a transverse, sectional view taken on the broken line 9—9 of FIG. 6;

FIG. 10 is a top plan view showing the supporting bracket of FIGS. 6 and 7 secured in operative relationship with an adjacent edge portion of a honeycomb core reinforced article;

FIG. 11 is an enlarged, fragmentary, sectional view taken on the broken line 11—11 of FIG. 10;

FIG. 12 is a transverse, sectional view showing a fragmentary cross section of a portion of a mounting bracket; and FIG. 13 is a fragmentary, sectional view showing the manner in which the under surface of the article is prepared for the reception of the adjacent portions of the mounting or supporting bracket or member.

Referring to the drawings, and particularly to FIGS. 1–5 thereof, I show a portion of a honeycomb core reinforced panel 10, said panel including a honeycomb core reinforcement 12 fabricated from stainless steel foil which has welded or otherwise secured to the opposite surfaces thereof face or surface sheets 14 and 16, the surface sheet 14 being referred hereinbelow for purposes of convenience as the top sheet, and the surface sheet 16 being referred to as the bottom sheet. While the portion of the panel 10 is illustrated in FIG. 1 as being of substantially flat configuration it will, of course, be understood by those skilled in the art that the panel 10 can be formed in any desired configuration after the affixation of the top and bottom surface sheets 14 and 16, respectively, to the adjacent portion of the honeycomb reinforcing core 12. The honeycomb core and surface sheets are fabricated, in the present embodiment of the invention, from stainless steel foil, but it will be obvious to those skilled in the art that various types of substitute materials, such as titanium, may be utilized without departing from the spirit of the invention. For purposes of convenience, reference is made to U.S. Letters Patent No. 2,910,153 which discloses a honeycomb core reinforced structural panel of the type that may be utilized in practicing the teachings of the present invention.

The practice of the method of the invention involves the initial deformation of the leading edge 18 of the panel 10 to partially crush the core 12 of the leading edge and to reduce the vertical cross section thereof to an extent to which it will fit to a predetermnied extent into the receptacle 22 provided in the mounting or attachment bracket or member 24. The mounting or attachment bracket or member 24 may be fabricated from any suitable material, such as steel, aluminum or the like and includes a laterally extending attachment plate 26 incorporating a fastener receiving opening 27, for a purpose which will be described in greater detail below.

The receptacle 22 is constituted by an elongated groove 28 which is defined by upper and lower walls 32 and 34, respectively. The interior surfaces of the walls 32 and 34 taper inwardly from the outer extremities thereof to their juncture with the vertical back wall 36 of the receptacle 22.

In affixing the leading edge of the panel 10 in operative relationship with the bracket 24, the bracket 24 is advanced over said leading edge to cause the leading edge 18 to be forced into the receptacle 22, thus causing the reinforcing core structure 12 to be crushed between the upper and lower surface sheets 14 and 16 to an extent equal to the depth of the receptacle 22. Ultimately, the leading edge 18 of the panel 10 is completely seated in the corresponding receptacle 22 in the manner shown in FIG. 4 of the drawings. To facilitate the securemnet of the leading edge 18 in operative relationship with the associated top and bottom walls 32 and 34 of the receptacle 22, openings 42 are formed in said top and bottom walls which permit the top and bottom surface sheets 14 and 16 to be rosette welded to the interior surfaces of said walls.

The outer extremities of the upper and lower walls 32 and 34 of the receptacle 22 taper sufficiently to render said extremities substantially coplanar with the adjacent areas of the surface sheets 14 and 16, as best shown at 52 in FIG. 5 of the drawings. The physical crushing of the leading edge 18 of the panel 10 serves to densify the crushed area and to greatly enhance the structural jointure characteristics of said area.

The intimate resulting relationship between the surface sheets and backet walls insures optimum welding conditions and also avoids sonically induced vibration and relative movement.

Illustrated in FIG. 5 of the drawings is the manner in which the brackets 24 may be utilized conjointly to attach two panels in operative relationship with each other by inserting a rivet 54, or similar fastener, through the openings 27 which are disposed in registration with each other by locating one securement portion 26 of a bracket 24 below the corresponding portion of an identical bracket.

Because of the relative depth of the receptacle 22, a substantial area of the associated panel 10 is disposed within said receptacle and a gradual compression of the leading edge 18 of the panel 10 is accomplished. In addition, aerodynamic characteristics are maintained because of the tapered edges of the walls 32 and 34 of the receptacle 22. For instance, the thickness of the edge may range from .012 to .009 inch in thickness and an adequate criterion of such thickness is that the edges be equal to or thinner than the associated surface sheet.

While I have described the use of rosette welding as a means of securing the mounting or attachment bracket 24 in operative relationship with the associated panel it will, of course, be obvious to those skilled in the art that other expedients can be utilized to secure the bracket 24 in operative relationship, among them being the use of high strength adhesives, blind riveting and through pins. If rosette or plug welding is used it is accomplished by the tungsten inert gas process.

The crushing of the edges of the associated panels in the brackets 24 creates a preload upon the edges which, consequently, enhances the structural values of the mode of attachment since there is an inherent tendency in the crushed portions of the panel to tend to return, to a certain extent, to their original uncrushed condition, thus materially enhancing the operative relationship of the edge of the panel with the associated mounting bracket.

Because the edges of the top and bottom walls 32 and 34 of the receptacle 22 correspond in thickness to the thickness of the top and bottom sheets 14 and 16, stress concentrations between said edges and the adjacent areas of the surface sheets are substantially eliminated. The mechanical action between the perimetrical edges of the top and bottom walls 32 and 34 of the receptacle 22 may be compared to that of hinged sections or to the deflection of diaphragms in relation to the surfaces upon which they are engaged.

The affixation of the bracket 24 in operative relationship with the associated panel 10 results in an article which can be readily attached in operative relationship with an associated and similar article or which can be attached to a corresponding surface. In forming the article by the method step of forcing the edge of the panel 10 into the tapered receptacle 22, the configuration of the bracket, so far as the receptacle 22 is concerned, is imposed upon the relevant area of the panel 10 and the bracket 24 thus serves as a die to cause the crushing and deformation of the panel 10. The utilization of the bracket as a die in this manner insures the absolute conformity of the dimensions of the crushed portion of the panel 10 to the dimensions of the receptacle 22 and results in the achievement of the preload mentioned hereinabove.

Because the receptacle 22 receives and deforms the edge of the associated panel 10 the inaccuracies which might result from the utilization of separate die members to deform and crush the edges of the panel 10 is eliminated. In addition, the brackets 24 are more securely affixed to the adjacent portions of the panels 10 because of their utilization as die members.

Another embodiment of the method, article and mounting or securing bracket of the invention is illustrated in FIGS. 6-13 of the drawings, the securing bracket 60 being fabricated from steel, or similar material, and being adapted to be engaged in operative relationship with the corresponding edge of a honeycomb core reinforced panel 62, as best shown in FIG. 11 of the drawings, said honeycomb core reinforced panel 62 having been previously formed by a suitable process, such as stretch forming or die forming into an arcuate configuration. The panel 62 includes surface sheets 64 and 66 which will be referred to hereinafter, for purposes of convenience, and not necessarily orientation, as the top surface sheet 64 and the bottom surface sheet 66. As in the previously discussed embodiment of the invention, the surface sheets 64 and 66 are maintained in operative relationship with each other by means of a reinforcing honeycomb core 68 and the surface sheets and honeycomb core 64 and 66, respectively, may be fabricated from stainless steel or other suitable material.

The mounting or securement bracket 60 is of generally arcuate configuration in plan and includes a body 72 having a plurality of radially oriented fingers 74 provided thereupon and defining therebetween receptacles 76 for the reception of adjacent portions of the honeycomb core reinforced panel 62.

The body 72 includes a flange 82 which incorporates a plurality of mounting holes 84 for the reception of fasteners, not shown, adapted to secure the bracket to an appropriate object or surface.

Defined on the upper surface of the body 72 is an arcuate shoulder 86 which serves as receptacle for the contiguous edge of the upper surface sheet 64 of the honeycomb core reinforced panel 62, as best shown in FIG. 11 of the drawings. The under side of the bracket 60 is provided with a plurality of cavities 88 which serve to lighten the bracket. In addition to being substantially arcuate in plan, the bracket 60 is also substantially arcuate in cross section, as best shown in FIGS. 8 and 11 of the drawings. The arcuity of the under surface of the bracket 60 constitutes a continuum of the curvilinear under surface of the surface sheet 66 associated with said bracket.

Each of the fingers 74 is substantially spatulate in plan and, as best shown in FIG. 6 of the drawings, the outer extremities 92 thereof are inscribed on a relatively large radius. Consequently, the continuous line defined by the juxtaposed fingers provides a relatively prolonged area of attachment for the associated panel, as will be described in greater detail hereinbelow.

Furthermore, each of the fingers 74 is of substantially V-shaped configuration, as best shown in FIGS. 9 and 12 of the drawings and, in addition, is provided with a tapered edge 94 which extends about the perimeter of each finger and the corresponding area 96 between the roots of the individual fingers 74. The thickness of the edge is substantially equal to the thickness of the adjacent surface sheet 66 so that, when the bracket 60 is disposed in operative relationship with the panel 62, there will be an aerodynamic fairing of the edge on the line constituted by the fingers and the area 96 adjacent the fingers with the corresponding surface of the bottom surface sheet 66, as best shown in FIGS. 11 and 12 of the drawings.

It will also be noted that the fingers 74, as best shown in FIG. 8 of the drawings, taper downwardly from their roots so that the outer extremities thereof are of minimal cross-sectional dimension while the fingers 74 have their greatest dimension immediately adjacent the arcuate receptacle or shoulder 86 provided adjacent the roots of the fingers 74.

Also provided upon the body 72 of the bracket 60 are angularly oriented attachment edges 102 and 104 which may be attached, in a manner to be described in greater detail below, to contiguous areas of the panel 62.

In fabricating the composite article of the invention, the honeycomb core reinforced panel 62 is first formed into the desired arcuate configuration as exemplified, in part, by the fragmentary, sectional view of FIG. 11. After the panel 62 has been properly shaped, the bottom surface sheet 66 is provided with a plurality of slots 108 which may be formed by milling, sawing or similar means. These slots are intended to be located coincidently with the apices 112 of the fingers 74 to accommodate the deformation which will occur in the relevant portions of the panel 62 during the subsequent steps of the process.

After the panel 62 has been prepared in the above described manner, it is placed in a suitable holding fixture wherein it is located in an inverted position, that is, with the upper surface sheet 64 supported on an appropriately shaped and conforming surface and with the bottom surface sheet 66 exposed to permit the mounting bracket 60 to be superimposed over the edge of the panel 62. It will be noted that the edge of the panel 62 has been cut in an arc conforming to the arcuate configuration of the receptacle 86 and that the bottom surface sheet 66 has been trimmed, as best shown at 114 in FIG. 11 of the drawings, for a purpose which will be described in greater detail below.

The superimposed bracket 60 is then located with respect to the prepared edge of the panel 66 so that the arcuate edge of the upper surface sheet 64, as best shown in FIG. 11 at 116, is located in the arcuate receptacle 86 with the right-hand edge 118 of the panel 62 being located immediately adjacent the angular attachment edge 104 of the bracket 60, as best shown in FIG. 10 of the drawings. After the bracket has been so located, a platen, plunger, or other pressure applying member is imposed upon the under surface of the bracket 60 to force the bracket 60 downwardly against the bottom surface sheet 66 and gradually to force the V-shaped fingers 74 into the contiguous areas of the panel 62 until the honeycomb core 68 underlying the fingers 74 is crushed into the configuration shown at 122 in FIGS. 11 and 12 of the drawings. The application of force continues until the tapered edges 94 of the fingers 74 are disposed in substantial coplanarity with the exterior surface of the bottom surface sheet 66, as best shown in FIGS. 11 and 12 of the drawings.

Therefore, as in the case of the previously discussed embodiment of the invention, a composite article is formed which consists of the panel 62 and the bracket 60 assembled by utilizing the bracket 60 as a die to deform the relevant areas of the panel 62 to crush the honeycomb core 68 underlying the fingers 74 and to, thus, densify the structure of the panel in the critical areas in which it is to be fixedly attached to the mounting bracket.

After the completion of the formation of the recesses in the panel under surface, the undeformed areas of the panel, as best shown in FIGS. 10 and 12 of the drawings, are located in the receptacles defined between the fingers 74. Consequently, the engagement of the bracket 60 with the relevant edge of the panel 62 is enhanced by the fact that relatively large, uncompressed areas of the panel 62 are disposed in the receptacles 76 defined by the fingers 74 and, consequently, the bracket is positively located in operative relationship with the edge of the panel. Incidentally, the arcuate configuration of the lower edge of the panel is shown at 126 in FIG. 13 of the drawings.

After the completion of the deformation of the panel 62 in the above described manner, the continuous tapered edge 94 provided on the fingers is welded, as best shown at 132 in FIGS. 10, 11 and 12 of the drawings, to the adjacent areas of the surface sheet 66. In addition, the arcuate edge 116 of the upper surface sheet 64 is welded to the lip of the receptacle 86 and also welded to the adjacent arcuate upper edges 136 of the bracket 60. Moreover, the angular attachment edges 102 and 104 are welded to the adjacent portions of the panel 62. Any conventional type of suitable welding process can be utilized. However, I have found that tungsten inert gas welding is one of the most effective means of accomplishing the welding steps described hereinabove.

It will be noted that, as best shown in FIG. 11 of the drawings, when the arcuate edge of the upper surface sheet 64 is disposed in the recess 86, the depth of the recess is such that it is approximately twice the thickness of the upper surface sheet 64. This permits the affixation of a gusset plate 142 in overlying relationship with the upper surface sheet 64, said gusset plate having a plurality of fingers 144 disposed in substantial correspondence with the underlying fingers 74 of the mounting bracket 60. If the gusset plate is utilized it can be welded in operative relationship with the upper surface of the mounting bracket 60 and the upper surface sheet 64, as best shown at 146 in FIG. 10 of the drawings.

By utilizing the mounting bracket 60 as a die to compress or crush the selected areas of honeycomb core and to deform the lower surface sheet 66, absolutely accurate conformity of the deformed areas to the configuration of the fingers 74 is accomplished with the consequent rigidity of affixation of the bracket 60 to the edge of the panel 62. Moreover, the location of the undeformed portions 122 of the panel 62 in the receptacles 76 defined between the fingers 74 provides a substantial undeformed mass between the recesses in the panel formed by the fingers 74.

Furthermore, the densification of the core structure accomplished at 112 by the penetration of the fingers 74 into the panel 62 greatly increases the joint strength with the subject area of the panel.

Consequently, when the panel portion 62 of the composite article is subjected to shear loads, the intimate structural relationship between the fingers and the receptacles 74 and 76, respectively, and the contiguous areas of the panel and the engagement of the arcuate edge of the upper surface sheet 64 with the receptacle 86, prevent structural failure between the contiguous areas of the mounting bracket 60 and panel 62.

In addition, subjection of the panel portion 62 of the composite article to compressive forces is adequately sustained because of the relatively large supportive area of the mounting bracket 60. In addition, the relatively large interacting areas achieved by the penetration of the fingers 74 into the panel structure and the relatively extended weldment lines at 132 and 146 between the panel 62 and the mounting bracket 60 greatly enhance the rigidity of affixation of the panel 62 in operative relationship with the mounting bracket 60.

Furthermore, the relatively large area of the mounting bracket 60 engaged with the adjacent portions of the panel 62 prevents stress concentrations characteristic of prior art fasteners insuring adequate distribution of both shear and compressive loads. The tapered edges of the fingers 74 and their conformity to the under surface of the panel 62, as defined by the bottom surface sheet 66, permits the achievement of continuous aerodynamic configurations, as is also the case with the upper surface of the panel 62 because of the accurate mating of the upper surface sheet 64 with the adjacent area of the bracket 60 at 116.

I thus provide by my invention a method of creating a composite article consisting of a mounting or supporting bracket and a configured panel constituted by honeycomb core reinforced surface sheets which is characterized by the utilization of the mounting or supporting bracket or member to structurally alter the essential structural configuration of the associated panel. Also characteristic of the invention is the provision of mounting or supporting brackets or members which are utilized to deform the adjacent areas of the associated panels and which have receptacle means incorporated therein adapted to receive portions of the panel to insure accurate mating of the panel with the brackets or members when they are joined in operative relationship with one another.

I claim:

1. In an attachment system, the combination of: an article having a compressible reinforcing core and first and second surface sheets on opposite sides of said core; and an attachment member having portions driven into said article to depress an underlying area of at least said first surface sheet and compress said core underlying said area, said portions of said attachment member being welded to said first surface sheet to positively secure said attachment member to said article, said attachment member incorporating a plurality of projecting fingers constituting said portions driven into said article and said member also including a recess having an edge of said second surface sheet secured thereto, the perimetrical edges of said fingers being welded to the juxtaposed surface sheet and the edge of said second surface sheet welded in said recess.

2. In a method of operatively connecting a mounting bracket to a honeycomb reinforced article, wherein said mounting bracket incorporates at least one receptacle for the reception of a corresponding portion of said article, the steps of: urging said bracket against said article to deform a portion of said article and said core into the configuration of said receptacle, said bracket including a plurality of projecting fingers having undersurfaces adapted to form corresponding depressions in said article when said bracket is urged into overlying relationship with said article; and welding said bracket to said article at the portion of said article disposed within the said receptacle, said welding step being accomplished by welding the perimetrical edges of said fingers to the adjacent surface of said article.

3. The method of claim 2 in which said bracket incorporates a recess and the adjacent edge of said article is welded to an abutting portion of said recess.

4. In a method of securing an attachment bracket in operative relationship with a honeycomb core reinforced article wherein said bracket includes a plurality of fingers and recess means adapted to receive adjacent edges of said article, said article having first and second surface sheets on opposite sides thereof; the steps of: providing a contour on the edge of said first surface sheet corresponding to the shape of said recess; urging said bracket downwardly against said second surface sheet to form depressions in said core, and said second surface sheet corresponding to the shape of said fingers; welding the perimetrical edges of said fingers to adjacent portions of said second surface sheet; and welding the previously contoured edge of said first surface sheet in said recess.

5. In the method of claim 4 in which said second surface sheet is provided with a number of slots corresponding to the positions of said fingers to accommodate the deformation of said second surface sheet by said fingers.

References Cited

UNITED STATES PATENTS

| | | | |
|---|---|---|---|
| 2,833,003 | 5/1958 | Bourne et al. | |
| 2,967,593 | 1/1961 | Cushman. | |
| 3,008,552 | 11/1961 | Cushman et al. | |
| 3,024,879 | 3/1962 | Kandra | 29—475 |
| 1,688,980 | 10/1928 | Miller. | |
| 2,465,603 | 3/1949 | Potchen | 52—615 |
| 2,957,196 | 10/1960 | Vhelden et al. | 151—7 |
| 2,986,247 | 5/1961 | Schnitt et al. | |
| 3,212,561 | 10/1965 | Eckel | 52—620 |

EDWARD C. ALLEN, Primary Examiner

U.S. Cl. X.R.

29—475; 52—615